United States Patent [19]

Palm et al.

[11] Patent Number: 5,472,303
[45] Date of Patent: Dec. 5, 1995

[54] BLIND RIVET-TYPE CLAMPING FASTENER

[75] Inventors: Erich Palm, Heerbrugg; Daniel Gasser, Rebstein, both of Switzerland

[73] Assignee: SFS Industrie Holding AG, Heerbrugg, Switzerland

[21] Appl. No.: 170,245

[22] PCT Filed: Apr. 20, 1993

[86] PCT No.: PCT/EP93/00959

§ 371 Date: Jul. 18, 1994

§ 102(e) Date: Jul. 18, 1994

[87] PCT Pub. No.: WO93/22567

PCT Pub. Date: Nov. 11, 1993

[30] Foreign Application Priority Data

Apr. 27, 1992 [DE] Germany .......................... 42 13 862.0

[51] Int. Cl.⁶ ...................................... F16B 13/04
[52] U.S. Cl. .................................. 411/29; 411/43

[58] Field of Search .................... 411/29, 43, 55, 411/30, 31

[56] References Cited

U.S. PATENT DOCUMENTS

| 4,629,380 | 12/1986 | Gunkel et al. | 411/29 |
| 5,183,357 | 2/1993 | Palm | 411/29 |
| 5,213,459 | 5/1993 | Palm | 411/29 |

*Primary Examiner*—Neill R. Wilson
*Attorney, Agent, or Firm*—Helfgott & Karas

[57] ABSTRACT

A blind rivet-type clamping fastener includes a deformable sleeve, a drift section insertable into or connectable to the sleeve, and a drilling section. The latter is held on either the sleeve or a drift section so that it can be axially moved towards the free end of the fastener or removed therefrom upon exertion of an axial force onto the drilling section during the setting of the clamping fastener.

11 Claims, 3 Drawing Sheets

BLIND RIVET-TYPE CLAMPING FASTENER

BACKGROUND OF THE INVENTION

The invention pertains to a blind rivet-type clamping fastener which includes a deformable sleeve part, a drift part which may be inserted into the sleeve part and cooperates with the same at least during the setting process, and a drilling part.

One example of a known rivet fastener (German Patent No. C 4,003,373) includes a rivet sleeve as well as a rivet drift which may be inserted into said rivet sleeve. The rivet sleeve and the rivet drift cooperate with each other via a thread. The enlarged head stud of the rivet drift is pressed against one end of the sleeve by turning the rivet drift relative to the rivet sleeve, so that the one end of the sleeve is expanded. Although such rivet fasteners are able to produce an excellent connection, the drilling part is still present at the rear side of the fastening point.

According to a different known variation (U.S. Pat. No. A 4,293,258), the drill tip, which is in this particular instance fastened onto the rivet sleeve, is also present once the setting process has been concluded.

The fact that this is practically always the case with self-drilling rivets is additionally substantiated by a previously disclosed self-drilling rivet (German Patent No. A 2,548,860). This particular rivet is provided with a plate-like drilling part which is constructed as one piece together with a widened head stud of the drift part, which, in other words, means that said drilling part is also present after the setting of the rivet fastener.

These protruding drilling parts represent a substantial hazard, in particular if the rear side of such connections is freely accessible. Although the utilization of self-drilling blind rivets substantially shortens the setting process and thus also reduces the mounting costs, the problem of injuries due to the protruding drilling parts remains.

SUMMARY OF THE INVENTION

It is an object of the present invention to provide a blind rivet-type clamping fastener of the initially mentioned type with which the advantages of a self-drilling design may be fully exploited during the mounting process, but which eliminates the hazard of injuries due to protruding drilling parts.

According to the invention, this and other objects are attained by the fact that the drilling part is held such that it may be moved or removed toward the free end of the clamping fastener by exerting an axial force during the setting of said clamping fastener.

The drilling part is sufficiently fastened on the clamping fastener during the drilling process, so that the hole required to accommodate the blind rivet-type clamping fastener may be produced. During the final setting of the clamping fastener, which means at the time at which the sleeve part is deformed correspondingly, a movement or removal of the drilling part is caused due to the exertion of forces in the axial direction. It is particularly advantageous that the drilling part does not have to be removed in a separate operation, but that the displacement or removal of the drilling part is facilitated directly by the setting process.

It is also particularly advantageous that the exertion of an axial force onto the drilling part may be triggered by the relative axial movement between the sleeve part and the drift part during the setting of the clamping fastener. This means that the axial movement between the sleeve part and the drift part during the deformation of the blind rivet-type clamping fastener is utilized to move or remove the drilling part in the axial direction. Only this particular measure facilitates that the drilling part may be removed without requiring an additional mounting or detaching operation.

The invention suggests that the drilling part is held on the sleeve part and/or the drift part in a nonpositive fashion in the axial direction and in a positive fashion in the rotational direction, whereby the drilling part is, on the side opposite the drill tip, provided with an approximately radially oriented stop surface which protrudes into the axial moving range of the drift part or the sleeve part.

It thus suffices if the drilling part protrudes radially into the moving range of the drift part or the sleeve part which may be moved relative to the drilling part in at least a small area in order to cause the movement or removal of the drilling part during the setting process.

Since the drilling part is only used once for producing the hole to accommodate the blind rivet-type clamping fastener, the mutual connection between the individual elements does not have to be rigid. It is solely required that the drilling part is held in such a way that it may not fall off, which means held in a nonpositive fashion in the axial direction. A positive retention of the drilling part in the rotational direction is naturally required in order to transfer the torque during the drilling process.

The drilling part is usually manufactured from a different material than the sleeve part and the drift part because the sleeve part consists of an easily deformable material, for example, aluminum, and the drift part must, in most instances, consist of a stainless material in order to prevent corrosion on the outer side of the fastening point which is exposed to atmospheric influences. However, the drilling part must consist of a hardenable steel, which means a carbon steel, because the drilling of holes into the substructure would otherwise not be possible.

A preferred application example of the invention suggests that the drift part consists of a bolt-shaped shaft and a head stud which accommodates the drilling part and has a larger diameter than the shaft, and that the drilling part protrudes radially over the section of the head stud which is situated directly adjacent to the drilling part over at least a portion of the periphery of the head stud.

Especially with rivet sleeves which are widened radially via the larger head stud of the drift part, it was established that the inner surface of the sleeve part is well set on the head stud after the widening process, so that it is solely required that the drilling part slightly protrudes over the section of the head stud of the drift part which is situated directly adjacent to the drilling part in order to exert the required axial force onto the protruding areas of the drilling part.

A preferred application example of the invention suggests that the drilling part is constructed as a plate-shaped punched part, whereby both lateral borders of the drilling part protrude radially over the adjacent section of the head stud of the drift part. This means that an axial force is exerted at two diametrically opposite points, so that a possible tilting of the inserted drilling part is effectively prevented, and the proper movement or removal of the drilling part is ensured.

An additional variation of the invention suggests that the head stud is constructed as a collar which has a diameter that is larger than the diameter of the shaft, and that the end area of the head stud which directly faces the drilling part has a reduced diameter.

It was established that this protruding area of the drilling part does not necessarily have to protrude over the outer diameter of the head stud of the drift part. It thus suffices if the section of the head stud which is situated directly adjacent to the drilling part has a correspondingly smaller diameter. Although the sleeve part is widened by the head stud of the drift part, the tensions in the sleeve part lead to the fact that said sleeve part follows the surface contour of the head stud over a subsequent section of the head stud with reduced diameter, which means that the diameter of the sleeve part is reduced again. This variation also provides a safe possibility to exert axial forces onto the drilling part in order to move or remove the drilling part in the axial direction. It is, in this particular variation, advantageous if the diameter of the head stud of the drift part approximately corresponds with the outer diameter of the sleeve part and thus the diameter drilled, whereby the section of the head stud which is situated directly adjacent to the drilling part is smaller than the diameter drilled.

Such a variation is particularly advantageous for reasons of manufacturing technology because the individual diameters may be adapted to each other without requiring drilling part sections which protrude excessively in the lateral direction.

With screws it is generally known to move a threaded tip or drill tip in the axial direction relative to a screw shaft and remove said tip from this screw shaft (British Patents Nos. 865,200 and 585,887). However, this instance does not pertain to a two-part fastener, and it is absolutely required to remove the drill tip or threaded tip in a separate mounting or detaching operation.

As far as self-drilling fasteners are concerned, it was, in regard to such fasteners, also suggested (German Patent No. C 4,003,374) to fasten a plate-shaped cutting part solely by pushing said cutting part onto the shaft, which means the rivet drift, so that retention by only press fitting suffices. This document also mentions the fact that this measure provides a possibility to remove the cutting part via a punching or pulling movement after the drilling process is concluded, which, in other words, means that a separate operation is required.

In comparison to the aforementioned solutions, this invention makes it possible to cause the axial movement or removal of the drilling part simultaneously with the setting of the blind rivet-type clamping fastener in just one operation.

Additional characteristics and advantages of the invention are, in the following, described in detail with reference to the figures.

DETAILED DESCRIPTION OF THE PREFERRED EMBODIMENTS

Figure 1:
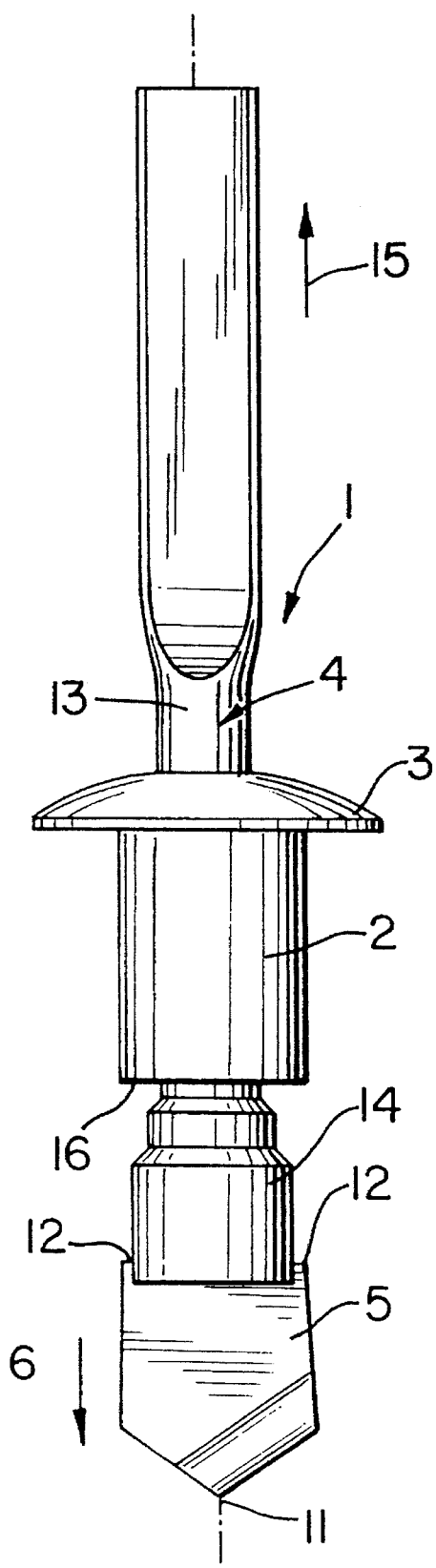
FIG. 1 is a front view of a blind rivet-type clamping fastener.

The blind rivet-type clamping fastener 1 essentially consists of a deformable sleeve part 2 which may be provided with a stop flange 3, and a drift part 4 which may be inserted into the sleeve part 2 and cooperates with said sleeve part 2 at least during the setting process, whereby the aforementioned arrangement may be realized by different means depending on the type of the blind rivet-type clamping fastener.

It is possible to cause the setting of the clamping fastener solely by axial drawing of the drift part relative to the sleeve part. An additional possibility consists of providing the sleeve part 2 and the drift part 4 with an inner thread and a corresponding outer thread, whereby the setting is in this particular instance caused by mutual turning, or at least by turning the drift part relative to the sleeve part.

The drilling part 5 is, in this particular variation, constructed as a plate-shaped punched part, but the measures according to the invention may also be utilized with a drilling part which has an essentially cylindrical cross section.

The invention attains the objective to move or remove the drilling part 5 during the setting process in the direction of the arrow 6, so that the protruding drilling part no longer cooperates with the blind rivet-type clamping fastener after the setting process is concluded. The drilling part 5 is for this purpose (as, for example, shown in FIG. 6) held on the sleeve part 2 in a nonpositive fashion in the axial direction and in a positive fashion in the rotational direction. The drilling part 5 engages into a depression 8 arranged on the drift part 4 with a corresponding extension 7, whereby the upper lateral sections 9 of the drilling part 5 engage into a continuous radial slot 10, so that the positive connection ensures that all aforementioned components rotate together. It is naturally also possible to use different types of connections for the connection between the one part and the drilling part 5.

The invention suggests that the drilling part 5 is on the side opposite the drill tip 11 provided with at least one approximately radially oriented stop surface 12 which protrudes into the axial moving range of the drift part 4 or the sleeve part 2, depending on the fact on which part the drilling part 5 is held. An axial force is exerted onto the radially protruding stop surfaces due to the relative movement between the drift part 4 and the sleeve part 2, whereby the aforementioned relative movement causes a movement or removal of the drilling part 5. Naturally, the stop surfaces 12 must not be oriented exactly radially, which means at a right angle to the central axis of the clamping fastener 1. These stop surfaces may also extend at a correspondingly acute angle since it is solely required that corresponding stop surfaces, protruding stop cams, or similar elements are provided. It would also be conceivable that only the area forming the stop surfaces 12 protrudes radially to the corresponding extent, and that the adjacent area, or the area between the stop surfaces 12 and the drill tip 11, has a correspondingly reduced diameter.

Figure 2:
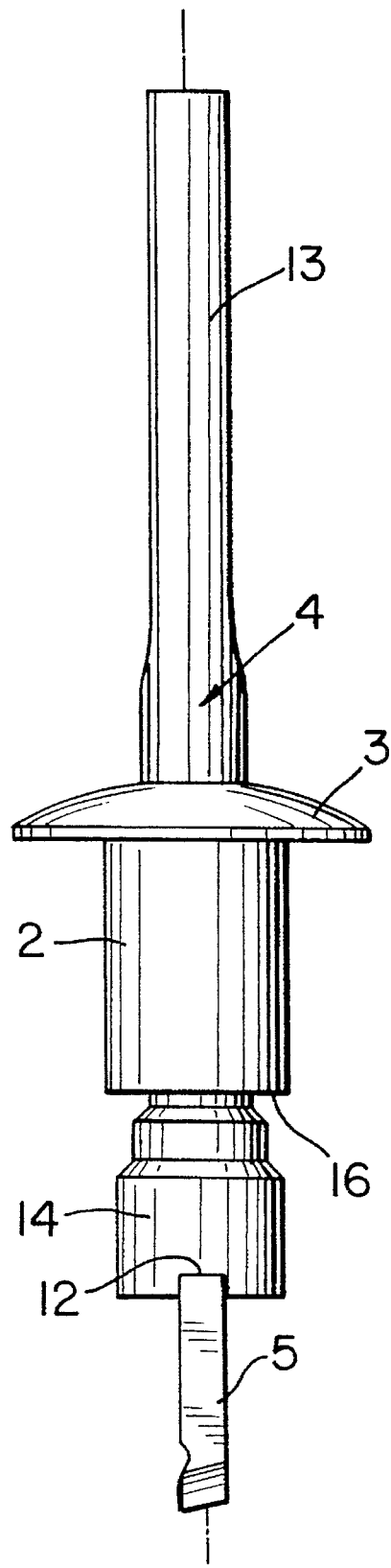
FIG. 2 is a side view of a blind rivet-type clamping fastener.
Figure 3:
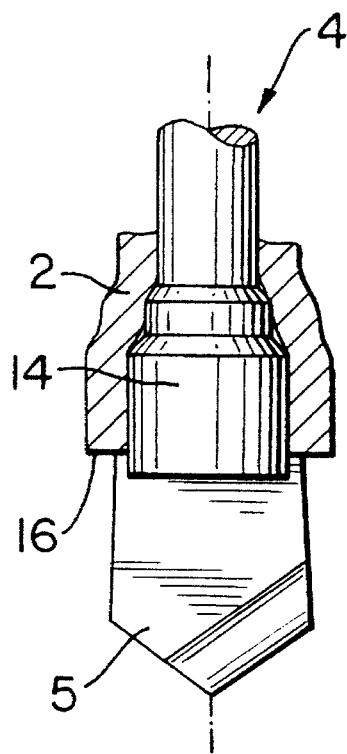
FIG. 3 is a section of the clamping fastener according to FIGS. 1 and 2 during the setting process.

In the preferred variation according to FIGS. 1–3, the drift part 4 consists of a bolt-shaped shaft 13 and a head stud 14 which has a larger diameter than the shaft 13 and accommodates the drilling part 5. This head stud 14 is, in this particular variation, widened in several stages. The drilling part 5 protrudes on both sides with the stop surfaces 12 radially over the section of the head stud 14 situated directly adjacent to the drilling part 5. It would suffice if the drilling part 5 only protrudes radially on one side, but this measure would be disadvantageous because the drilling part could be tilted during the process of removing the drilling part.

If the sleeve part 2 is situated in the hole produced by the drilling part 5 after the conclusion of the drilling process, and if the drift part is retracted in the direction of the arrow 15 by means of a corresponding tool, the sleeve part 2 is widened by the penetrating head stud 14 as shown in FIG. 3. However, the sleeve part 2 is always well set on the surface of the head stud 14 with its inner diameter due to the internal tensions in the widened sleeve part. After corresponding axial movement of the drift part 4 in the direction of the arrow 15, namely as a movement relative to the sleeve part 2, the free end area 16 of the sleeve part 2 adjoins the stop surfaces 12 of the drilling part 5 so that an axial force is exerted onto the drilling part 5 at this location. Continued retraction of the drift part causes a movement of the drilling part 5 in the direction of the arrow 6 and thus removal of the same from the drift part 4. This means that a relatively simple constructive measure obtains an optimal effect by facilitating the simultaneous drilling of a hole, the setting of a blind rivet-type clamping fastener, and the removal of the drilling part required for the production of the hole in just one operation. The drilling part is not only removed to eliminate the danger of injuries, but also to eliminate the possibility of corrosion since such drilling parts are usually manufactured from a carbon steel.

Figure 4:
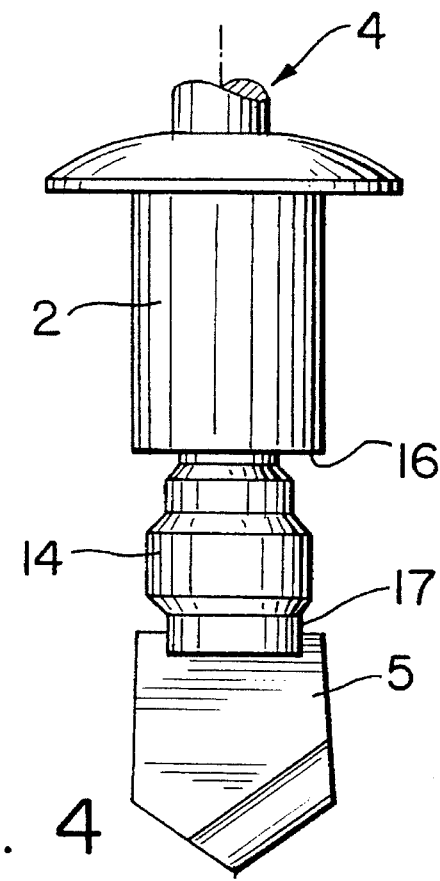
FIG. 4 is a variation of a clamping fastener.
Figure 5:
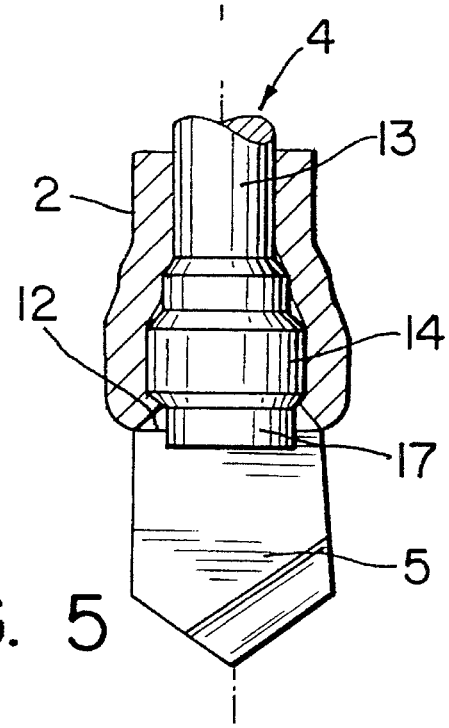
FIG. 5 is a section through the clamping fastener of FIG. 4 shortly before the conclusion of the setting process.
Figure 6:
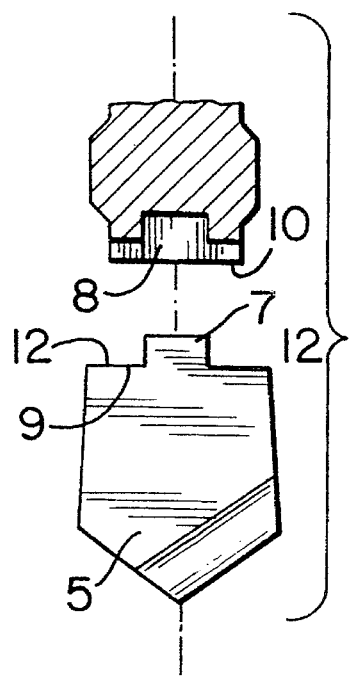
FIG. 6 is a sectioned representation of the mutual fastening arrangement between the drilling part and the drift part of the clamping fastener.

The design and function of the variations according to FIGS. 4–6 are similar to the ones of the variations according to FIGS. 1–3, but the head stud 14 is constructed as a collar which has a diameter that is larger than the shaft 13. The end area 17 of the head stud which directly faces the drilling part 5 has a reduced diameter. It is advantageous if the diameter of the head stud 14 approximately corresponds with the outer diameter of the sleeve part 2 and thus the diameter drilled, whereby the section 17 of the head stud 14 which is situated directly adjacent to the drilling part 5 is smaller than the diameter drilled. It suffices in this particular variation if the drilling part 5 with the stop surfaces 12 protrudes radially over at least the diameter of the section 17 because this sleeve part exactly follows the contour of the head stud 14 and also the section 17 during the setting and the widening of the sleeve part 2. Due to the internal tensions during the widening process, the sleeve part adapts itself to the section 17 with a smaller diameter which is situated behind the head stud 14 with a larger diameter, so that the lower end area of the sleeve part 2 again reaches the stop surfaces 12 of the drilling part 5 and removes the same in the axial direction.

Figure 8:
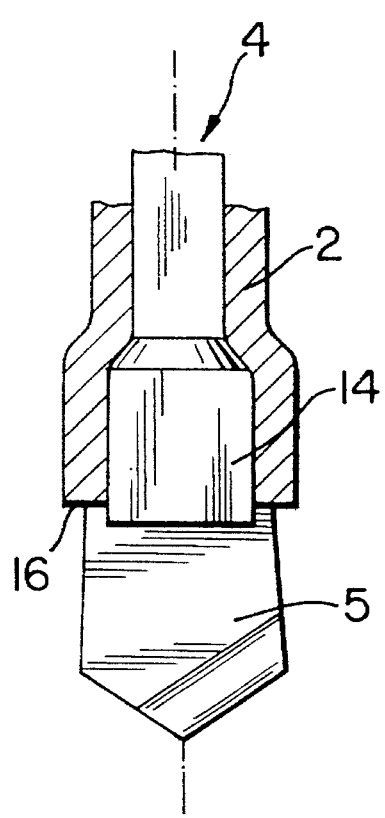
FIG. 8 shows the same clamping fastener of FIG. 7 immediately before the conclusion of the setting process.
Figure 7:
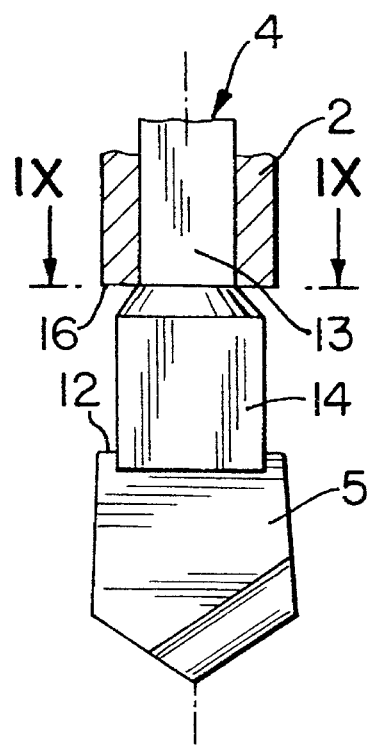
FIG. 7 is a partially sectioned representation through an additional variation of a clamping fastener.
Figure 9:
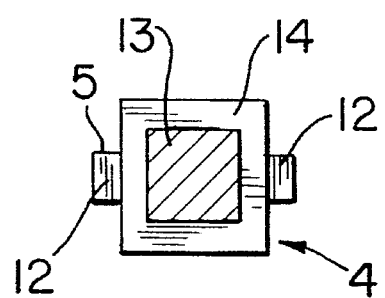
FIG. 9 is a section along line IX—IX in FIG. 7.

The variations according to FIGS. 7–9 solely differ from the two previously described variations by the fact that the drift part 4 has a shaft 13 or a head stud 14 with a cross-sectional shape that is different from the previously described circular shape. These sections are, in this particular variation, constructed with a square cross section. It is naturally also possible to choose any other cross-sectional shape, whereby elevations or grooves which extend in longitudinal direction and cooperate correspondingly with a surface on the inner side of the sleeve part may be arranged on the surface of the drift part. Such a variation is particularly advantageous if the torque for the drilling process is transferred via the drift part as well as the sleeve part.

In this variation, corresponding stop surfaces 12 of the drilling part 5 also protrude radially over the head stud 14, so that the sleeve part which advances along the head stud 14 during the setting process adjoins the stop surfaces 12 of the drilling part 5 with its free end 16.

The previous description pertains to application examples in which the drilling part 5 is held on the drift part that is practically always situated on the inside. However, it would also be conceivable to fasten the drilling part 5 on the drift part as well as the sleeve part, whereby the aforementioned variation would be particularly advantageous for the application example according to FIGS. 7–9. An additional variation is also obtained if the drilling part 5 is exclusively held on the sleeve part 2. In a variation in which the sleeve part 2 and the drift part 4 cooperate via a thread, and in which the drift part travels axially inward relative to the sleeve part during the setting process, there exists the possibility to move or remove the drilling part which is held in the sleeve part in the axial direction.

The measures according to the invention may thus be utilized independently from the fact that the setting of a blind rivet-type clamping fastener is performed by axial drawing or by an axial movement due to a thread connection.

The measures according to the invention may be utilized with blind rivet-type clamping fasteners consisting of any material, but it must be ensured that an axial force is exerted onto the drilling part due to the relative axial movement between the drilling part and either the drift or the sleeve part in order to move and remove said drilling part in the axial direction.

We claim:

1. In a blind rivet-type clamping fastener comprising a deformable sleeve part (2), a drift part (4) which can be inserted into the sleeve part (2) and is connected to the sleeve (5), the improvement comprising the drilling part (5) being configured as a platelet-shaped part and being held on at least one of said sleeve part and said drift part so as to enable said drilling part to be moved or removed toward a free end of the clamping fastener (1) by exerting an axial force (6) on the drilling part during the setting of said clamping fastener, said drift part including a shaft (13) and a head stud (14) having an end section (17) adjoining and facing said drilling part, said head stud having a diameter greater than a diameter of said shaft.

2. Clamping fastener according to claim 1, wherein the exertion of an axial force onto the drilling part (5) may be caused by a relative axial movement between the sleeve part (2) and the drift part (4) during the setting of the clamping fastener (1).

3. Clamping fastener according to claim 1, wherein the drilling part (5) is held on at least one of the sleeve part (2) and the drift part (4) in a nonpositive fashion in an axial direction and in a positive fashion in a rotational direction, the drilling part (5) being provided on a side opposite to a drill tip (11) with at least one approximately radially directed stop surface (12) which penetrates into an axial moving range of one of the drift part (4) and the sleeve part (2).

4. Clamping fastener according to claim 1, wherein the shaft (13) of the drift part (4) is bolt-shaped and the head stud (14) accommodates the drilling part (5), and the drilling part (5) protrudes at least over a part of a periphery of the head stud (14) radially over the section (17) of the head stud which is situated directly adjacent to the drilling part (5).

5. Clamping fastener according to claim 4, wherein the drilling part (5) constructed as a platelet-shaped punched part has both lateral borders thereof protrude radially over the section (17) of the head stud (14) of the drift part (4) which is situated directly adjacent to the drilling part.

6. Clamping fastener according to claim 4, wherein the head stud (14) is constructed as a collar which has a larger diameter than the shaft (13), and the end section (17) of the head stud (14) directly faces the drilling part (5) and has a reduced diameter.

7. Clamping fastener according to claim 6, wherein the diameter of the head stud (14) of the drift part (4) approximately corresponds to an outer diameter of the sleeve part (2) and thus also a diameter being drilled, and the section (17) of the head stud (14) which is situated directly adjacent to the drilling part (5) is smaller in diameter than the diameter being drilled.

8. Clamping fastener according to claim 5, wherein the head stud (14) is constructed as a collar which has a larger diameter than the shaft (13), and the end section (17) of the head stud (14) directly faces the drilling part (5) and has a reduced diameter.

9. A blind-rivet-like clamp fastener, comprising a deformable sleeve part (2), a drift part (4) which can be inserted in the sleeve part (2) and which is effectively connected with the sleeve part (2) at least during the setting process, and a drilling part (5), which is held on at least one of the sleeve part and the drift part so that it can be shifted or stripped off by action of a force, which can be triggered by a relative motion between the sleeve part (2) and the drift part (4) produced by the setting process of the clamp fastener (1), the drilling part (5) being held non-positively as viewed in an axial direction of the fastener and positively as viewed in a rotational direction of the fastener and having, at a side thereof opposite to a drilling tip (11), an approximately radially aligned stop surface (12) which protrudes into a range of axial movement of one of the drift part (4) and the sleeve part (2), the drift part (4) having a shaft (13) and a head projection (14) having an adjoining section (17) of a larger diameter than said shaft, the drilling part (5) being configured as a platelet-shaped stamped part having two side edges protruding radially over the adjoining section (17) of the head projection (14) of the drift part (4).

10. The clamp fastener of claim 9, wherein the adjoining section (17) is an end region of the head projection (14), which directly faces the drilling part (5) and is constructed with a tapered diameter.

11. The clamp fastener of claim 10, wherein the diameter of the head projection (14) of the drift part (4) corresponds approximately to an outer diameter of the sleeve part (2) and thus to a drilling diameter, the section (17) of the head projection (14) immediately adjoining the drilling part (5), having a diameter which is smaller than that of the drilling part.

* * * * *